United States Patent [19]

LaGesse et al.

[11] Patent Number: 4,872,403
[45] Date of Patent: Oct. 10, 1989

[54] AUTOMATIC COFFEE MAKER

[76] Inventors: Michael F. LaGesse; Sally LaGesse, both of #10 Shireford La., Ferguson, Mo. 63135

[21] Appl. No.: 308,203

[22] Filed: Feb. 9, 1989

[51] Int. Cl.[4] .......................................... A47J 31/00
[52] U.S. Cl. ...................................... 99/280; 99/285; 99/295; 99/299; 99/305
[58] Field of Search ................. 99/279, 280, 281, 282, 99/283, 285, 294, 295, 299, 300, 304, 305, 306, 307; 426/433

[56] References Cited

U.S. PATENT DOCUMENTS

| | | | |
|---|---|---|---|
| 3,320,073 | 5/1967 | Bixby, Jr. et al. | 99/71 |
| 3,343,478 | 9/1967 | Hausam | 99/283 |
| 3,408,921 | 11/1968 | Freese | 99/295 |
| 3,450,024 | 6/1969 | Martin | 99/295 |
| 3,596,588 | 8/1971 | Moss | 99/282 |
| 3,610,132 | 10/1971 | Martin et al. | 99/295 |
| 3,719,505 | 3/1973 | Mazza | 99/275 |
| 4,457,217 | 7/1984 | Ogawa et al. | 99/295 |
| 4,550,024 | 10/1985 | LeGranse | 426/77 |
| 4,579,048 | 4/1986 | Stover | 99/280 |
| 4,603,621 | 8/1986 | Roberts | 99/307 |
| 4,697,503 | 10/1987 | Okabe et al. | 99/306 |
| 4,759,274 | 7/1988 | Schmidt | 99/285 |

Primary Examiner—Robert W. Jenkins
Attorney, Agent, or Firm—Charles C. Logan, II

[57] ABSTRACT

The automatic coffee maker has a saddle valve attachment for connecting it to a cold water line via a small plastic water hose, thereby producing an automatic water supply to the coffee maker. The desired number of cups of coffee can be selected and activated using a dial/pushbutton set of controls. A water level indicator on the water reservoir assembly allows the user to automatically refill the automatic coffee maker in accordance with projected demand for coffee. A light indicator provides a visual cue that the automatic water supply valve is activated. An adjustable cup-setting dial and automatic timer allow the user to select the appropriate water level for the number of cups desired. Water can also be poured into the top of the water reservoir assembly for operation when the automatic coffee maker is not connected to the water supply. The unit uses coffee filters that are premeasured and have a self-contained packet of coffee grounds or crystals that allows the consumers to make precisely the number of cups they wish to brew.

5 Claims, 2 Drawing Sheets

AUTOMATIC COFFEE MAKER

BACKGROUND OF THE INVENTION

The invention relates to a coffee maker and more specifically to an automatic coffee maker having controls to make a precise number of cups of coffee.

In the past there have been numerous automatic coffee makers but they generally require the user to remove the cover and manually add the required amount of water. They do not have any structure for connecting them to the cold water supply line in a house or building. Also most of the present day automatic coffee makers do not have structure in their water reservoir assemblies that allows the user to visually known how many cups of water are available to be heated in the hot water heating chamber for usage. Additionally, it is necessary to measure the amount of coffee grounds to be added to the brewing unit prior to having the hot water dumped thereon. Also after the hot water has passed through the coffee grounds it is necessary to perform the messy task of removing the coffee grounds and cleaning the inside of the brewing unit.

It is an object of the invention to provide a novel automatic coffee maker that can be connected to the cold water line of a house or building.

It is also an object of the invention to provide a novel automatic coffee maker that has a water level indicator on the outside of the water reservoir assembly so that the number of cups of water available for heating can be quickly determined.

It is another object of the invention to provide a novel automatic coffee maker that has a light indicator that provides a visual cue that the automatic water supply valve is activated.

It a further object of the invention to provide a novel coffee maker having an adjustable cup-setting dial and automatic timer that allow the user to select an appropriate water level for the number of cups of coffee desired.

It is an additional object of the invention to provide a novel coffee filter having a premeasured, self-contained packet of coffee grounds or crystals therein.

SUMMARY OF THE INVENTION

Applicant's novel automatic coffee maker has been designed so that it is probable and can still be connected to a cold water line of a house or building. This is accomplished by a saddle valve attachment that can be connected directly to a cold water line and the attachment also has structure allowing it to be connected to a water supply tube whose other end would be connected to the water inlet port of the automatic coffee maker.

The automatic coffee maker has an on/off switch that protrudes from its front wall. The switch is pushed in for turning it on and turned ¼ turn to the right for the off position. It is connected electrically to an automatic timer having an adjustable cup setting dial. This time is electrically connected to an electric solenoid flow valve that controls the amount of water that can pass through the inlet port of the coffee maker to the top end of the cold water tube whose outlet port is within the water reserve assembly of the unit. This allows the user to dial in the exact number of cups of hot water he wishes to be heated for making that same predetermined number of cups of coffee. The dial automatically returns to the last setting, no further adjustment is needed to operate the unit until user decides to change the volume of water.

A water flow indicator on the front of the housing of the coffee maker provides a visual cue that the electric solenoid flow valve is activated.

The water level indicator on the front wall of the water reservoir assembly allows the user to pick the appropriate premeasured coffee filter to be used in the brewing unit for the number of hot cups of coffee desired. The premeasured coffee filters have a self contained pack of coffee ground or crystals therein. These coffee filters are disposable and available in a variety of sizes, allowing the consumer to select the specific coffee filter having the precise number of cups of coffee grounds therein. These coffee filters are available in 4, 6, 8, 10 or 12 cup packages. After they have been used, it is merely necessary to remove the brewing unit and dump out the coffee filter which automatically removes the coffee grounds. A mere quick rinsing of the inside of the brewing unit makes it ready for reuse. The unit also operates on regular loose ground coffee and filters.

DESCRIPTION OF THE PREFERRED EMBODIMENT

Figure 1:
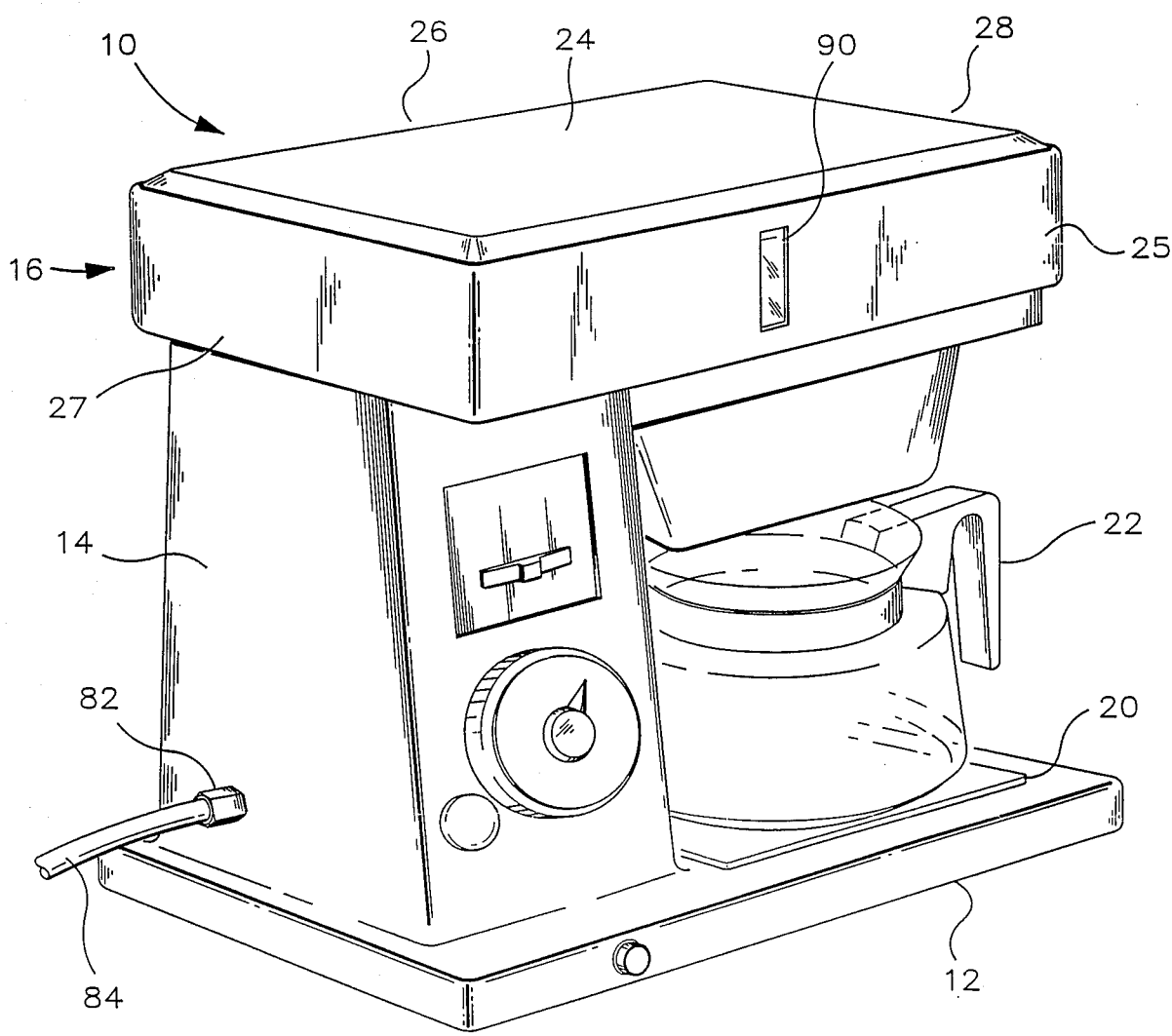
FIG. 1 is a front perspective view of applicant's novel automatic coffee maker.
Figure 3:
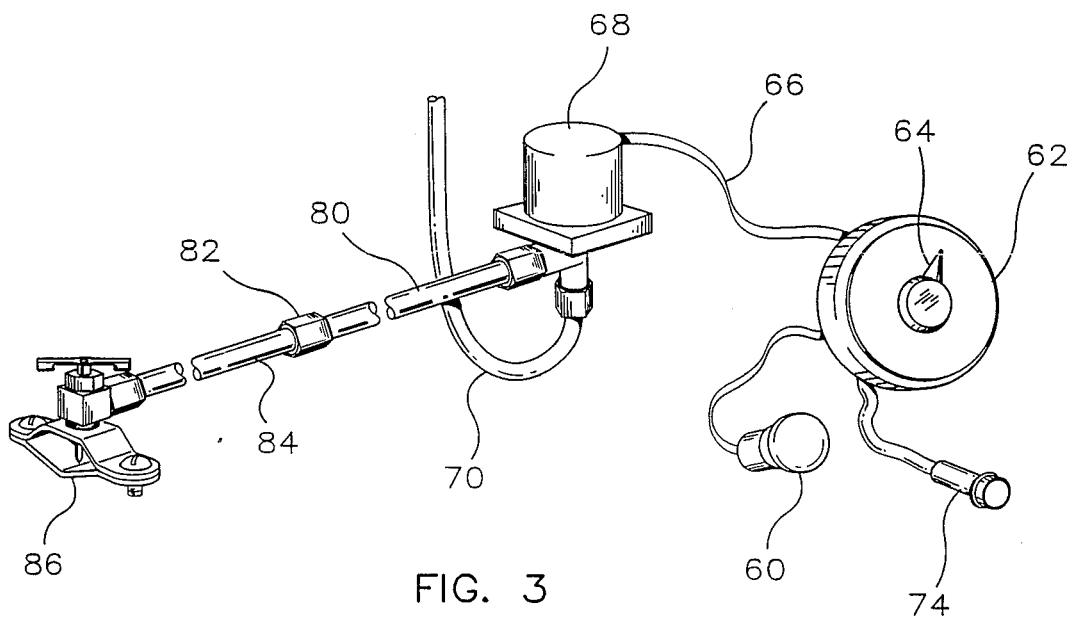
FIG. 3 is a front perspective view illustrating the structure for connecting the coffee maker to a cold water line and also the structure that is utilized to control the predetermined number of cups of water that would be heated for the desired number of cups of coffee.
Figure 2:
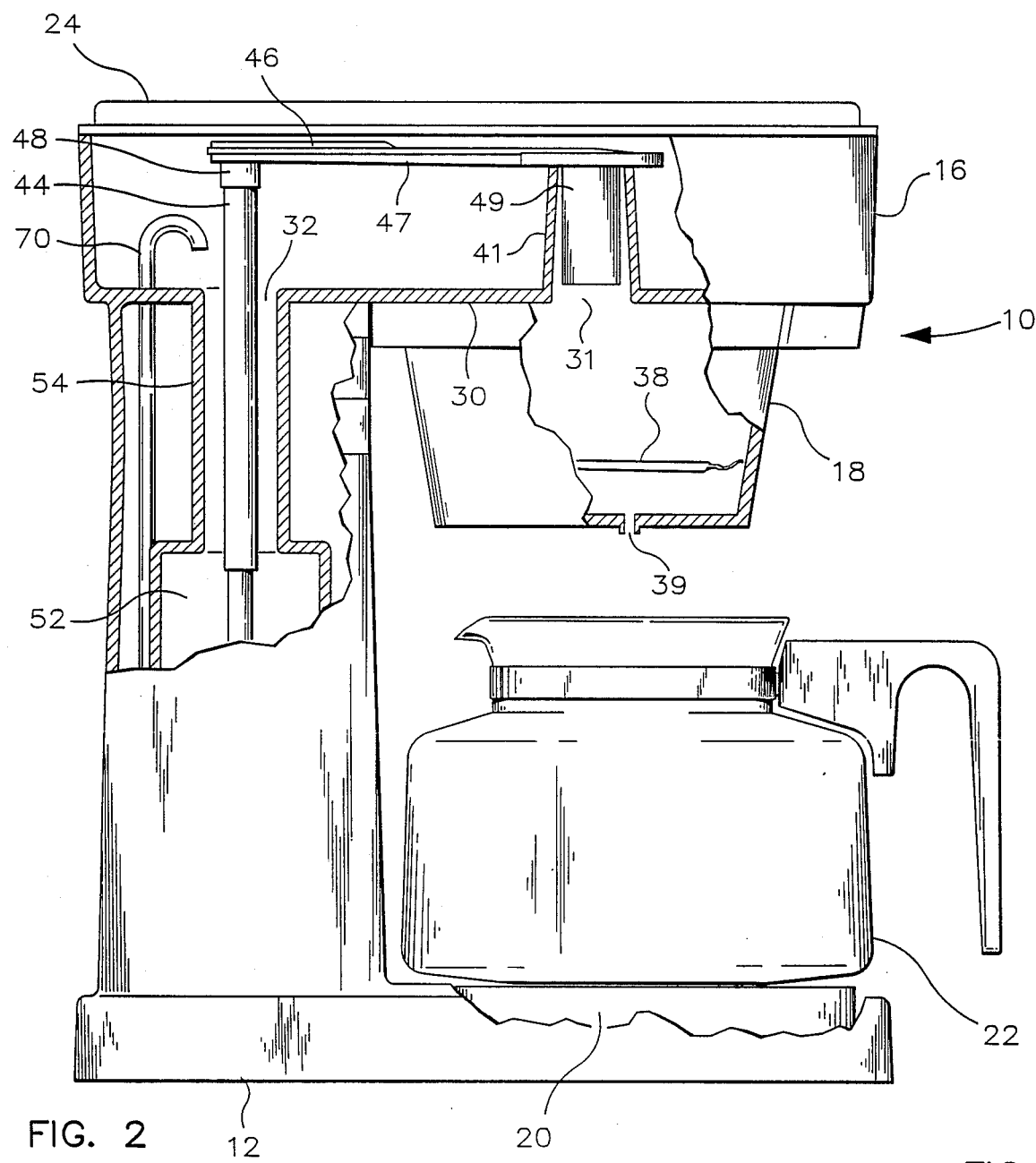
FIG. 2 is a side elevation view with portions in cross section illustrating the automatic coffee maker.
Figure 4:
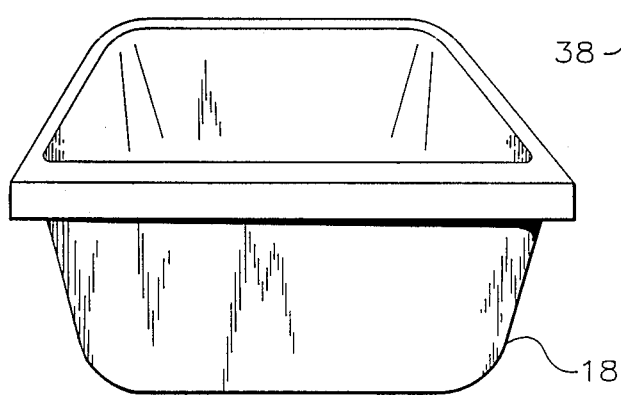
FIG. 4 is a front perspective view of the brewing unit.
Figure 5:
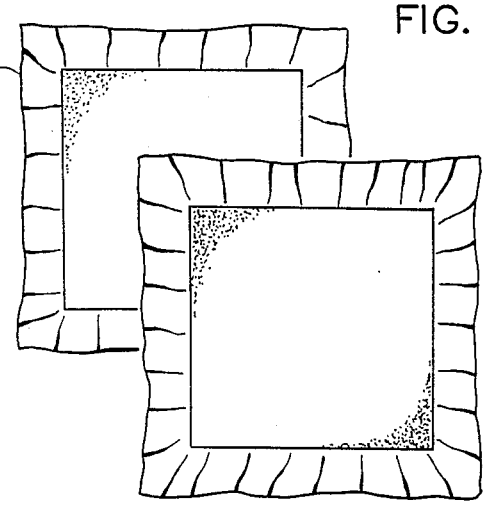
FIG. 5 is a top plan view of the premeasured coffee filters.

Applicant's novel automatic coffee maker will now be described by referring to FIGS. 1-5 of the drawings. The automatic coffee maker is generally designated numeral 10.

The basic components of the automatic coffee maker 10 are the base 12, the vertically oriented housing 14, the water reservoir assembly 16, and the brewing unit 18. Base 12 has an electric warming plate 20 upon which is supported a decanter 12.

Water reservoir assembly 16 has a removable cover 24, a front wall 25, a rear wall 26, laterally spaced side walls 27 and 28 and a bottom wall 30. A hot water outlet port 31 and a cold water outlet port 32 are formed in bottom wall 30. Hot water outlet port 31 is positioned above the cup-shaped brewing unit 18. The coffee filter packets 38 would be removably positioned in the brewing unit and the hot water that passes through them then exits through drain port aperture 39 into the decanter 22. A tubular collar 41 surrounds hot water outlet 31 and extends upwardly from bottom wall 30. Extending upwardly through cold water outlet port 32 is hot water outlet tube 44. It has a connecting tube portion 47 with a minor neck portion 48 formed on its one end and a major neck portion 49 formed on its other end. Minor neck portion 48 removably telescopes on to the top end of hot water outlet tube 44. Major neck portion 49 removably telescopes into the interior of tubular collar 41.

Hot water heating chamber 22 would heat the water therein through conventional state of the art structure. Tube 54 has its bottom end connected to hot water heating chamber 52 and its top end connected to cold water outlet port 32. The bottom end of hot water outlet tube 44 extends downwardly into hot water heating chamber 52 where the water percolates to transfer the hot water from hot water heating chamber 52 to the hot water outlet port 31 of water reserve assembly 16.

Mounted on the front wall of housing 14 is an on/off switch 60 that is connected to automatic timer 62. Automatic timer 62 has a preadjustable tension set dial 64 which allows any number of cups up to 12 to be made. Electrical wires 66 run from automatic timer 62 to the electric solenoid flow valve 68. This allows the time period valve 68 is open to be set depending upon the amount of water required for the predetermined number of cups of coffee. A cold water tube 70 has its bottom end connected to electric solenoid flow valve 68 and its top end is contained within the chamber of water reserve assembly 16. A water flow indicator light 74 is also mounted on the front of housing 14 and it indicates when the electric solenoid flow valve 68 is open.

Water supply tube 80 has its one end connected to electric solenoid flow valve 68 and its other end connected to device disconnect coupling 82. A second water supply tube 84 has its one end connected to disconnect coupling 72 and its other end connected to water supply saddle valve attachment 86. This attachment would be connected directly into the cold water line in a house or building.

A plastic see-through water level indicator 90 is formed in the front wall 25 of water reservoir assembly 16.

What is claimed is:

1. An automatic coffee maker comprising:
a vertically oriented housing;
a horizontally oriented base mounted under said housing and having a decanter support portion that extends laterally from said housing and said base having a top surface electric warmer plate mounted thereon;
a water reservoir assembly having a bottom wall, a front wall, a rear wall and laterally spaced side walls extending upwardly from the parameter of said bottom wall;
a removable cover for the top of said water reservoir assembly;
a hot water outlet port in the bottom of said water reservoir assembly at a position vertically above said warming plate, a tubular collar surrounding said hot water outlet port and extending upwardly from said bottom wall;
a cold water outlet port in the bottom wall of said water reservoir assembly at a position vertically above said housing;
a hot water heating chamber mounted in said housing;
a drain tube having its upper end connected to the cold water outlet port of the bottom wall of said water reservoir assembly and its bottom end connected to said hot water heating chamber;
means connected to said hot water heating chamber for delivering a predetermined number of cups of hot water to the hot water outlet port of said water reservoir assembly;
a cup-shaped brewing unit removably mounted to the bottom of said water reservoir assembly below said hot water outlet port;
an elongated cold water tube having its top end in said water reservoir assembly and its bottom end connected to an electric solenoid flow valve;
a water supply tube having a first end and a second end, said second end being connected to said electric solenoid flow valve; and
means connected to said electric solenoid flow valve for measuring a predetermined number of cups of hot water that are delivered to said brewing unit.

2. An automatic coffee maker as recited in claim 1 further comprising means for detachably connecting the first end of said water tube to a household cold water line.

3. An automatic coffee maker as recited in claim 1 further comprising water level indicator means positioned in the front wall of said water reservoir assembly.

4. An automatic coffee maker as recited in claim 1 further comprising a disposable self contained coffee filter packet having a premeasured amount of coffee grounds therein for a predetermined number of cups of coffee.

5. An automatic coffee maker as recited in claim 1 wherein said means connected to said electric solenoid flow valve for measuring a predetermined number of cups of hot water that are delivered to said brewing unit comprises an adjustable cup setting dial mounted on the front of said housing and it is connected to an automatic timer for keeping the solenoid flow valve open long enough to deliver the number of cups of water indicated by said adjustable cup setting dial.

* * * * *